Jan. 5, 1960 A. S. JENSEN 2,920,141

DIAGONAL CODED QUANTIZING SIGNAL TRANSMISSION

Filed March 14, 1955 2 Sheets-Sheet 1

INVENTOR.

ARTHUR S. JENSEN

BY [signature]

ATTORNEY

Jan. 5, 1960 A. S. JENSEN 2,920,141

DIAGONAL CODED QUANTIZING SIGNAL TRANSMISSION

Filed March 14, 1955 2 Sheets-Sheet 2

INVENTOR.
ARTHUR S. JENSEN
BY
ATTORNEY 2,920,141

DIAGONAL CODED QUANTIZING SIGNAL TRANSMISSION

Arthur Seigfried Jensen, Princeton, N.J., assignor to Radio Corporation of America, a corporation of Delaware Application March 14, 1955, Serial No. 494,066

1 Claim. (Cl. 179—15)

The present invention relates generally to signal transmitting and receiving systems and particularly to signal multiplexing arrangements for processing signal information.

It is known that signal information may be divided into discrete energy levels to enable the transmission of signal information with a minimum of redundancy to thereby reduce transmission bandwidth requirements. These systems are generally known as quantizing systems. In each system of this type, the number of quantizing levels is generally limited by the signal to noise ratio available, however, high quality signal transmission requires the use of a relatively large number of quanta levels. On the other hand, the use of a large number of quanta levels demands increased circuitry and high power consumption.

It has been proposed that the quality of signal transmission may be improved by the general system of residue integration which provides an additional quantum of information in accordance with the basic signal variation. In this method, the difference between the transmitted quantized signal and the basic signal before quantizing, called the residue, is integrated until it is equal to one quantum level. When the residue has reached this level, it is added as a pulse equal to one quantum level to the quantized output. Thus, the integrated residue appears as a pulse of variable frequency proportional to the residue signal.

A system of coding for quantized signal information has been proposed wherein one of a plurality of signals is varied as a continuous function while the other of a plurality of signals may vary in discrete abrupt signal level variations. This is known as diagonal coding. With this type of coding, it is still desirable to reduce the apparent abrupt changes in signal level and provide an illusion of a continuous function to thereby improve signal translation.

It is accordingly an object of this invention to provide an improved signal translating system wherein the signal information is quantized in such a manner that it provides the illusion of a greater number of quanta levels than are actually utilized.

It is a further object of the present invention to provide a quantizing system enabling high fidelity signal translation while utilizing a minimum number of signal levels.

It is another object of the present invention to provide a signal translating system in which the fine level differences between the basic signal and the quantizing level are reproduced at a receiving terminal as recognizable elements of signal information.

In accordance with the present invention, a plurality of signals are combined in a diagonally coded quantizing system to provide discrete signal levels for transmission. The quantized information is continuously compared with the original signal and the difference termed the residue is integrated and applied to the quantizing matrix at such times as the total residue equals one quantum level.

In this manner, the resulting transmitted signal more nearly represents the function of the continuous waves prior to quantizing.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

The invention is described below as applied to a color television transmitting and receiving system. However, it is to be understood that the invention may be applied to transmit and receive any plurality of intelligence signals at reduced bandwidths or a single signal of broad bandwidth part of which has been heterodyned to a lower frequency. Furthermore, although it is disclosed, for example, in relation to a transmission system employing radiated energy it may equally well be applied to systems employing any type of transmission.

The operations involved in carrying out the invention will be first described somewhat briefly following which the apparatus for performing these operations and a detailed description of the functioning of the apparatus will be given.

In general, the problem of providing discrete quanta levels which represent information relating to a plurality of signal information is one of representing an area by a line by assigning certain points in the area to a given point on the line. The particular code which may be produced by any given arrangement may vary. However, the discussion of the matrix illustrated in Figure 1 will illustrate one form of a code for performing this function.

Figure 1:
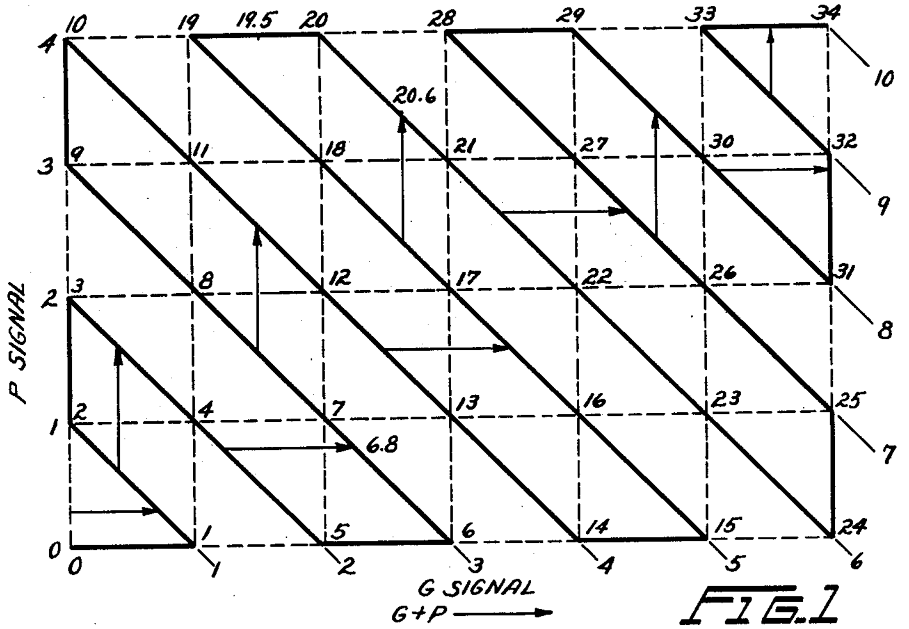
Figure 1 is a matrix illustrating the diagonal coding for quantizing a plurality of signals and illustrates one of the codes that may be accomplished in accordance with the present invention.

At the transmitter a coder must translate the original values of the amplitudes of the P and G signals from the scene, as a pair of coordinates, into a single value M which is the amplitude of signal to be transmitted. Obviously, since this involves the conversion of an area into a line, some compromise is to be made. This is done by translating all the colors lying along a line into a single point M. Referring to Figure 1, several arrows are drawn, each to be referred to as isolines since all the colors lying along any one line is translated by the coder into a signal whose amplitude is represented by the value of M at the head of the arrow. For example, all colors whose $P=0.8$ and $G=1.2$ to 2.2 would be enciphered into $M=6.8$. At the receiver this would be deciphered to $P=0.8$, $G=2.2$. Likewise, all colors for which $G=2.6$ and $P=2.4$ to 3.4 would be enciphered into $M=20.6$. The receiver would reproduce this as $P=3.4$ and $G=2.6$.

Obviously, a set of isolines in any direction may be chosen. Some consideration of the geometry of Figure 1 indicates that the isolines as shown is the best choice in alternate diagonals, horizontal and vertical, but for some of the possible coding devices other choices are more convenient from a design standpoint.

It will be observed in Figure 1 that the value of the quantity $G+P$ increases from zero in the lower left hand corner to 10 in the upper right hand corner so that lines of equal $G+P$ are diagonals at 135°. $(G+P)$ is a measure of the brightness. It will be further noted that within any unit range of $G+P$, between two adjacent diagonals of equal $G+P$ as drawn in Figure 1, the amplitude M of the signal to be transmitted can be generated by a function which is the sum of a constant and either $+G$, $-G$, $+P$, $+(G-P)$ or $-(G-P)$.

It will be appreciated that the transmitted signal M is a continuously varying signal within any one diagonal (of constant $G+P$), but must change discontinuously as $G+P$ increases beyond the integral value into the next diagonal. This means that the signal is quantized in only one of the two dimensions of the array, in the direction of brightness. This means that though the number of brightness levels is limited to eleven (counting black), ideally a single infinity of colors can be reproduced. However, considering that the signal noise ratio at the receiver is 35, one can compute that theoretically 175 just perceptibly different colors are available.

*Limitations*

Noise is the first and foremost limitation. Without this it would be possible to transmit any amount of information within any frequency bandwidth and time limitation (frame time). To insure that noise signals cannot make radical errors in the reproduced color, the diagonal cipher is chosen. The transmitted signal amplitude values M are numbered in the matrix of Figure 1 back and forth diagonally. If noise changes the output signal by one or two numbers, the received signal is within $M\pm2$, no large error in color results, and certainly the brightness is unchanged. The effect is primarily that of color dilution so that receivers in lower signal-noise areas would receive a more and more washed out picture (but of good brightness rendition) until where the signal-noise ratio was only 10, the dilution would be 100% and the received picture would be black and white, having 10 shades of gray.

A more detailed discussion concerning diagonal coding for quantizing systems may be found in U.S. Patent 2,643,289 issued June 23, 1953 to G. C. Sziklai for television systems.

Figure 2:
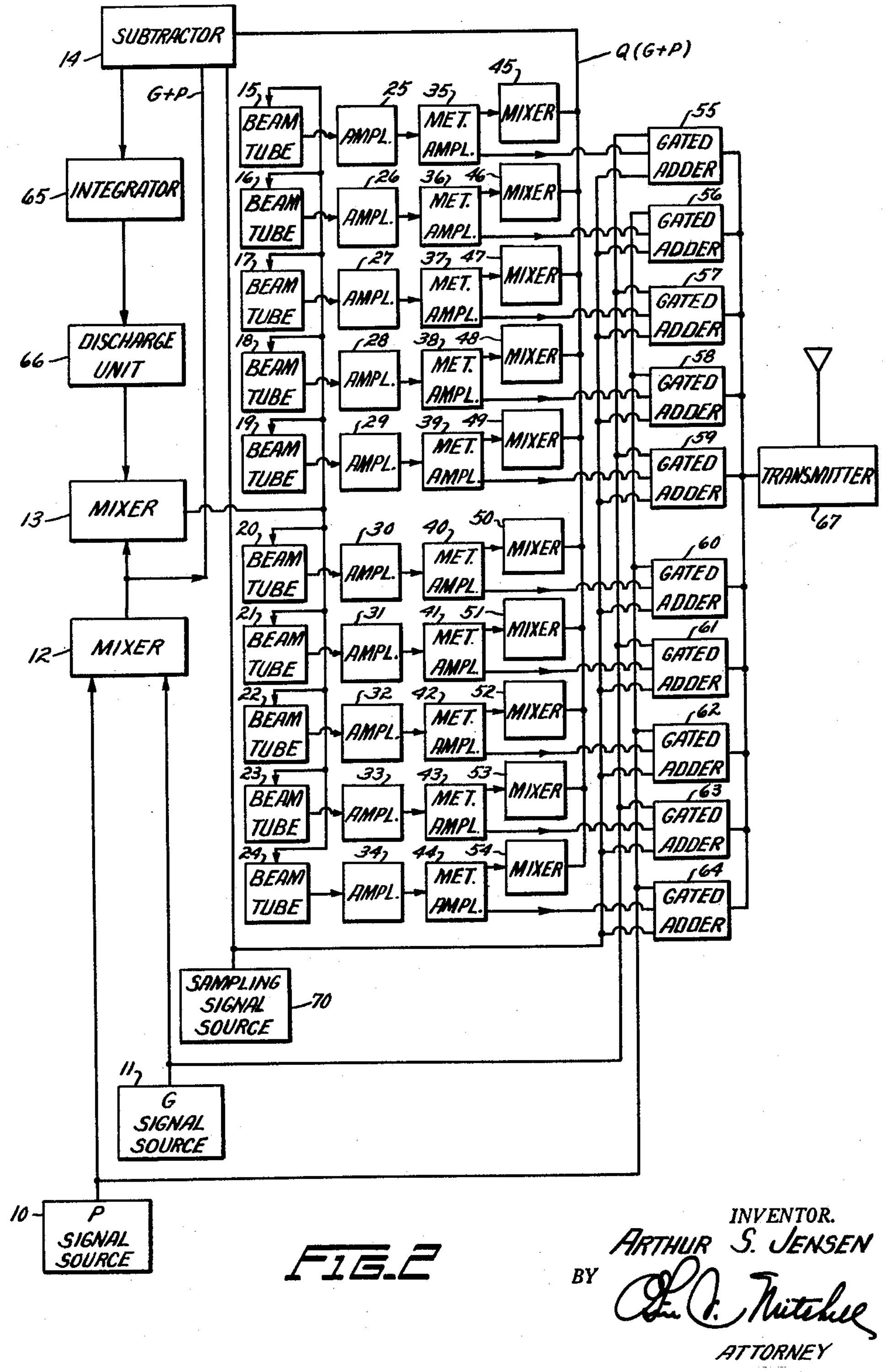
Figure 2 shows in block diagram one form of signal translating equipment which may be applied to a transmitter constructed in accordance with the present invention; and, Figure 3 is a schematic circuit diagram of a portion of the block diagram illustrated in Figure 2.

It may now be seen that the transmitting system illustrated in block diagram in Figure 2 is appropriate to provide a coded transmission in accordance with the matrix of Figure 1. A pair of signal sources 10 and 11 representing respectively a P signal source and a G signal source may of course represent the signal information from a plurality of color television cameras. The G signal source may represent the color information from a green camera and the P signal source may represent multiplexed signal information from the red and blue cameras.

The output signal from the two signal sources 10 and 11 is applied to a linear mixer stage 12 which provides in its output circuit the sum of the G and P signals. This mixed output signal is simultaneously applied to a second linear video mixer stage 13 and to a subtractor stage 14 as will be more fully hereinafter discussed.

The output signal from the second linear mixer stage 13 is simultaneously applied to the anodes of a plurality of beam deflection tubes 15 through 24. It is to be noted that each of these beam deflection tubes 15 through 24 is constructed and arranged so that only one of the plurality of tubes may be rendered conductive by any given signal level. It is further noted that these beam deflection tubes 15 through 24 are rendered conductive during a predetermined time interval by the sampling pulse which is applied from the sampling signal source 70. The output signal from the beam deflection tube which is rendered conductive by this arrangement is applied to a corresponding one of a plurality of signal amplifier stages 25 through 34 and it is to be noted that each of these signal amplifier stages is normally in a non-conducting state so as to provide an output signal in a negative going direction only upon the receipt of information from the corresponding one of the beam deflection tubes.

The output signal from the amplifier stage which has been rendered conductive is applied to a metering amplifier which is adjusted to provide an output signal proportional to the quantizing level associated with the particular beam deflection tube with which it is associated. The output of the particular metering amplifier which has accordingly been activated is applied to one of a plurality of mixer stages 45 through 54 which by virtue of a common load resistor provide an output signal for application to a subtractor stage 14. The output of the particular mixer stage represents the quantized sum of the G and P signals and is compared in the subtractor stage with the unquantized G plus P signal which is received from the first linear mixer stage 12, thereby providing in the output of the subtractor stage 14 a signal representing residue information or a difference signal which is applied to an integrator 65.

The integrator 65 is coupled with a discharge unit 66 in such fashion as to energize the discharge unit at such time that the residue information equals one quantum unit at which time it is applied to the second linear mixer stage 13. The output of the linear mixer stage 13, as previously discussed, is utilized to activate one of the plurality of beam deflection tubes and in view of the fact that the integrated residue information is included in the output of the mixer stage it may be readily seen that the particular beam deflection tube which is energized at a given time is determined by the sum of the G and P information plus the integrated residue information.

The output signal from the beam deflection tubes 15 through 24 is as above described applied to the signal amplifier stages 25 through 34 respectively and to the metered amplified stages 35 through 44 respectively. As only one of the beam deflection tubes 15 through 24 is conductive at any given time only one of the signal amplifier stages 25 through 34 is effective to provide an output signal which is applied to the corresponding one of the metered amplified stages 35 through 44 which in turn provides an input signal corresponding to a particular quantizing level for the corresponding one of the gated adder stages 55 through 64.

A gating signal is applied to each of the gated adder stages 55 through 64 from the sampling signal source 70 to render each of them conductive, if simultaneously a signal is applied from the corresponding one of the metered amplifier stages 35 through 44. Accordingly, the quantized $G+P$ signal is added to either the P signal or G signal depending on the instantaneous level of the $G+P$ signal. It may be noted at this time that the G signal is applied to alternate adder stages 55, 57, 59, 61 and 63 and the P signal is applied to the intermediate adder stages 56, 58, 60, 62 and 64.

The ultimate output signal from the adder stages 55 through 64 therefore represents the sum of the quantized $G+P$ signals including the integrated residue signal and the instantaneous value of either the G or P signal. It may readily be seen therefore that the function provided by this particular arrangement is that represented by the diagonal code matrix of Figure 1. It is also noted that the combined output of the gated adder stages 55 through 64 may be applied to a transmitting device 66 illustrated as a rectangle containing the legend transmitter.

Figure 3:
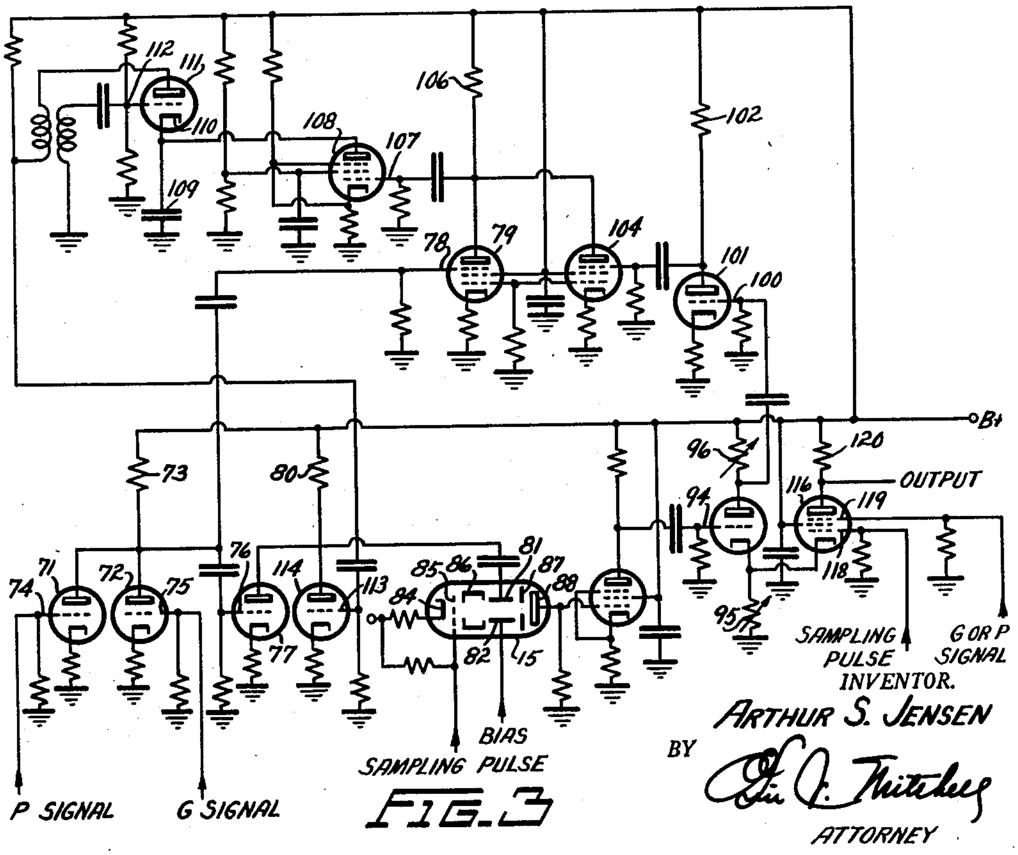

A particular electronic circuit for performing the functions represented by the block diagram of Figure 2 which for simplicity shows only one of the beam deflection tubes, one of the signal amplifier stages, one of the metered amplifiers and one of the gated amplifiers thereby representing the equipment necessary to process one quantum level is illustrated in Figure 3 to which reference is now made.

The mixer stage 12 is represented as a pair of electron discharge devices 71 and 72 having a common anode load resistor 73. The signal information from the P signal source and the G signal source may be applied respectively to the control electrodes 74 and 75 of the electron discharge devices 71 and 72 to develop across the load resistor 73 a signal voltage which represents the instantaneous sum of the $G+P$ signals. This signal voltage is applied simultaneously to the control electrode 76 of an electron discharge device 77 utilized as one-half of the second linear stage 13 and to one of the control electrodes 78 of a multigrid electron discharge device 79 which is utilized as one-half of the subtractor stage 14. The output of the second linear mixer stage is developed across an anode load resistor 80 and applied along with an appropriate bias level to the deflection plates 81 and 82 of a beam deflection tube 15.

The beam deflection tube 15 further comprises beam generating elements including a cathode 84, a control grid 85 to which the sampling pulse may be applied from the sampling signal source 70 and accelerating electrodes 86. The beam deflection plates are affected depending on the bias and the signal level received from the second linear mixer stages to control the electron beam so as to cause it to impinge either on a mask 87 or to pass through an aperture in the mask 87 and impinge on a dynode 88. If the signal level is such as to cause the beam to impinge upon the dynode 88 an output signal will be derived from the beam deflection tube and applied to the control electrode 92 of a multigrid electron discharge device utilized as a signal amplifier stage. The output signal from the signal amplifier stages is developed across an anode load resistor 93 and applied to the control electrode 94 of an electron discharge device utilized as a metered amplifier stage.

It is noted that the cathode resistor 95 and the anode load resistor 96 of the metered amplifier stages is adjusted to provide an output signal which is proportional to a particular quantum level.

The output signal which may be derived from across the anode load resistor 96 is applied to the control electrode 100 of an electron discharge device 101 which is utilized as a mixer stage representing one of a plurality of electron discharge devices which are connected to have a common anode load resistor illustrated by the resistor 102. Accordingly, the output signal which is derived from across the anode load resistor 102 represents the quantized $G+P$ signal and is applied to one of the control electrodes of a multigrid electron discharge device 104 which is utilized in a subtractor stage and in combination with the electron discharge device 78 to provide a residue signal which is developed across the anode load resistor 106.

This residue signal is applied to the control electrode 107 of a pentode electron discharge device 108 which is operated in a normally off condition and which is rendered conductive an extent depending upon the particular level of the residue signal. Conduction by the electron discharge device 108 is effective to charge the storage capacitor 109 an amount which is proportional to the level of the residue signal. As the charge on the capacitor 109 is increased, the potential at the cathode 110 of an electron discharge device 111 utilized in a blocking oscillator circuit is lowered until it reaches a potential determined by the voltage divider arrangement associated with the control grid 112.

At this time, the electron discharge device 111 is rendered conductive so as to discharge the storage capacitor 109 through the triode thereby providing an output pulse equal to one quantum level which is applied to the control electrode 113 of an electron discharge device 114 utilized in the second half of the second linear mixer stage.

It may therefore readily be seen that the output signal from the second linear mixer stage which is developed across the anode load resistor 80 represents the instantaneous level of the $G+P$ signals and the integrated residue information at such times that the integrated residue information has attained a predetermined level.

Returning now to the metered amplifier device, it may be seen that an output signal is derived across the cathode resistor 95 and applied by common cathode coupling to an electron discharge device 116 utilized as a gated adder stage. Sampling pulses are applied to the control electrode 118 to render the gated adder stage conductive during a predetermined period when signal information is available from the beam deflection tube 15. Also signal information is applied to another control electrode 119 of the electron discharge device 116 from either the G or P signal source depending on whether the particular device is utilized as an intermediate or alternate adder stage as above discussed.

Accordingly, the output signal which is derived across the anode load resistor 120 represents the sum of the quantized $G+P$ signals including the integrated residue information and either the G or P signals.

It is seen that in accordance with the system provided by the present invention, a quantized signal is provided which more nearly represents the instantaneous level of the basic signal information while utilizing a minimum of quanta levels. Furthermore, in accordance with the system provided by the present invention, instantaneous peak levels may be accurately represented since the residue signal is not derived from the difference between the quantized output signal and the continuous sum of the input signal. It is further noted that signal information which has been provided in accordance with the present invention may readily be received and decoded by signal receiving systems which have been designed to decode conventional diagonally coded quantized signals without additional equipment.

Having thus described the invention, what is claimed is:

An information signal coding apparatus for bandwidth reduction comprising, means for deriving a first voltage wave representative of a first intelligence, means for deriving a second voltage wave representative of a second intelligence, each of said voltage waves having a predetermined bandwidth, means for algebraically combining said first and second voltage waves to form a combined wave, means for restricting said combined wave to one of a plurality of discrete values of amplitude to form a quantized signal, means for generating a difference signal representative of the difference between said combined wave and said quantized signal, means for algebraically combining said difference signal at a discrete amplitude with said combined wave to form a corrected quantized signal, and means for periodically adding said corrected quantized signal selectively and individually to said first and second voltage waves thereby to derive a continuous signal for transmission having a reduced bandwidth as compared with the sum of the bandwidths of each of said plurality of signal waves.

References Cited in the file of this patent

UNITED STATES PATENTS

| | | |
|---|---|---|
| 2,516,587 | Peterson | July 25, 1950 |
| 2,617,879 | Sziklai | Nov. 11, 1952 |
| 2,643,289 | Sziklai | June 23, 1953 |
| 2,664,462 | Bedford et al. | Dec. 29, 1953 |
| 2,759,998 | Labin et al. | Aug. 21, 1956 |
| 2,784,256 | Cherry | Mar. 5, 1957 |